(12) United States Patent
Dennis et al.

(10) Patent No.: US 9,008,986 B2
(45) Date of Patent: Apr. 14, 2015

(54) VARIABLE TOOL CALIBRATION

(75) Inventors: Mark Kenneth Dennis, Missouri City, TX (US); Swapnesh Ramachandran, Maharashtra (IN)

(73) Assignee: Schlumberger Technology Corporation, Sugar Land, TX (US)

( * ) Notice: Subject to any disclaimer, the term of this patent is extended or adjusted under 35 U.S.C. 154(b) by 618 days.

(21) Appl. No.: 13/087,968

(22) Filed: Apr. 15, 2011

(65) Prior Publication Data

US 2012/0265468 A1  Oct. 18, 2012

(51) Int. Cl.
*G06F 19/00* (2011.01)
*E21B 47/00* (2012.01)
*E21B 47/10* (2012.01)

(52) U.S. Cl.
CPC ............. *E21B 47/00* (2013.01); *E21B 47/1015* (2013.01)

(58) Field of Classification Search
USPC ......................................................... 324/339
See application file for complete search history.

(56) References Cited

U.S. PATENT DOCUMENTS

| | | | |
|---|---|---|---|
| 4,439,831 A * | 3/1984 | Sinclair ............................. | 702/7 |
| 4,899,112 A | 2/1990 | Clark et al. | |
| 6,408,953 B1 * | 6/2002 | Goldman et al. ............... | 175/39 |
| 7,141,981 B2 | 11/2006 | Folberth et al. | |
| 7,190,169 B2 | 3/2007 | Fanini et al. | |
| 7,408,355 B1 | 8/2008 | Forgang et al. | |
| 7,598,741 B2 * | 10/2009 | Fanini et al. .................. | 324/339 |
| 2006/0017442 A1 | 1/2006 | Folberth | |
| 2007/0170923 A1 | 7/2007 | Forgang et al. | |
| 2011/0144960 A1 * | 6/2011 | Weng et al. ....................... | 703/2 |

FOREIGN PATENT DOCUMENTS

WO      2009006077 A1   1/2009

* cited by examiner

*Primary Examiner* — Jonathan C Teixeira Moffat
*Assistant Examiner* — Hien Vo
(74) *Attorney, Agent, or Firm* — Cathy Hewitt

(57) ABSTRACT

The present disclosure relates to a method to calibrate logging measurements from a logging tool for which one or more attributes vary over the course of logging. A logging tool is provided and a pre-logging calibration function for the logging tool is obtained. Logging measurements are made using the logging tool, and a post-logging calibration function for the logging tool is obtained. A variable calibration function using the pre-logging calibration function and the post-logging calibration function is determined, and the logging measurements are calibrated using the variable calibration function. The variable calibration function may be discrete or continuous and linear or non-linear. A non-linear calibration function may be based on measurements of one or more of the varying attributes of the logging tool. A discrete calibration function may have three or more calibration factors.

20 Claims, 3 Drawing Sheets

VARIABLE TOOL CALIBRATION

CROSS-REFERENCE TO OTHER APPLICATIONS

N/A

BACKGROUND

1. Technical Field

The present disclosure relates generally to the logging of subsurface formations surrounding a wellbore using a downhole logging tool, and particularly to determining calibration values for a downhole logging tool whose properties change while the tool is being used.

2. Background Art

Logging tools have long been used in wellbores to make, for example, formation evaluation measurements to infer properties of the formations surrounding the borehole and the fluids in the formations. Common logging tools include electromagnetic tools, nuclear tools, and nuclear magnetic resonance (NMR) tools, though various other tool types are also used.

Early logging tools were run into a wellbore on a wireline cable, after the wellbore had been drilled. Modern versions of such wireline tools are still used extensively. However, the need for information while drilling the borehole gave rise to measurement-while-drilling (MWD) tools and logging-while-drilling (LWD) tools. MWD tools typically provide drilling parameter information such as weight on the bit, torque, temperature, pressure, direction, and inclination. LWD tools typically provide formation evaluation measurements such as resistivity, porosity, and NMR distributions. MWD and LWD tools often have components common to wireline tools (e.g., transmitting and receiving antennas), but MWD and LWD tools must be constructed to not only endure but to operate in the harsh environment of drilling.

An operator may log a section of a well with one of several logging tools. Critical elements of those tools may require calibration for accurate measurement interpretation. During drilling, under certain conditions, some physical part of the tool may change permanently over the period of time the tool is in use. That change may render the prior (pre) calibration useless. For example, the metal collar that houses measurement sensors can abrade due to severe drilling conditions, causing the collar's diameter to reduce beyond the calibration limits.

SUMMARY

The present disclosure relates to a method to calibrate logging measurements from a logging tool for which one or more attributes vary over the course of logging. A logging tool is provided and a pre-logging calibration function for the logging tool is obtained. Logging measurements are made using the logging tool, and a post-logging calibration function for the logging tool is obtained. A variable calibration function using the pre-logging calibration function and the post-logging calibration function is determined, and the logging measurements are calibrated using the variable calibration function. The variable calibration function may be discrete or continuous and linear or non-linear. A non-linear calibration function may be based on measurements of one or more of the varying attributes of the logging tool. A discrete calibration function may have three or more calibration factors.

Other aspects and advantages will become apparent from the following description and the attached claims.

DETAILED DESCRIPTION

Some embodiments will now be described with reference to the figures Like elements in the various figures will be referenced with like numbers for consistency. In the following description, numerous details are set forth to provide an understanding of various embodiments and/or features. However, it will be understood by those skilled in the art that some embodiments may be practiced without many of these details and that numerous variations or modifications from the described embodiments are possible. As used here, the terms "above" and "below", "up" and "down", "upper" and "lower", "upwardly" and "downwardly", and other like terms indicating relative positions above or below a given point or element are used in this description to more clearly describe certain embodiments. However, when applied to equipment and methods for use in wells that are deviated or horizontal, such terms may refer to a left to right, right to left, or diagonal relationship as appropriate.

Figure 1:
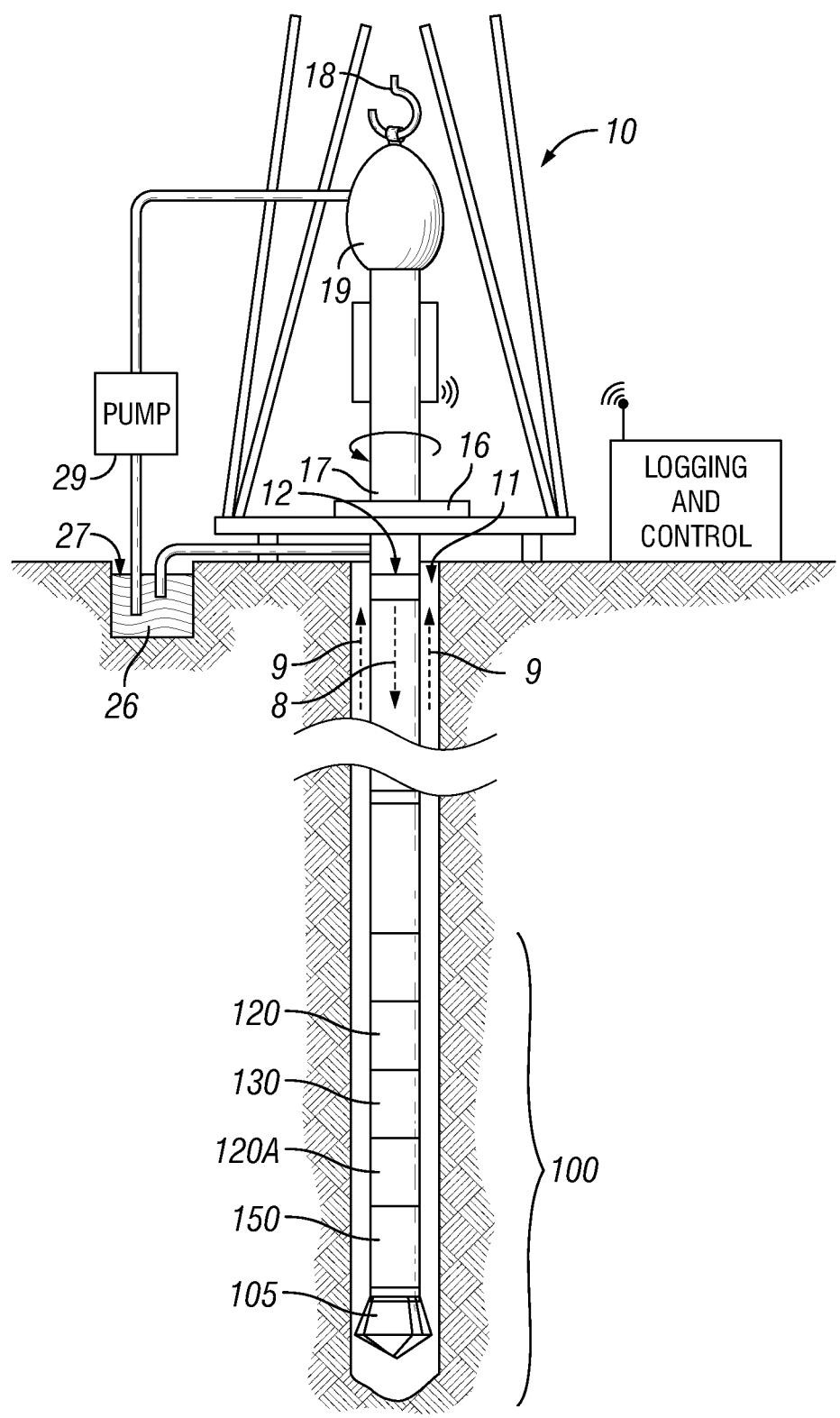
FIG. 1 illustrates an exemplary well site system.

FIG. 1 illustrates a well site system in which various embodiments can be employed. The well site can be onshore or offshore. In this exemplary system, a borehole 11 is formed in subsurface formations by rotary drilling in a manner that is well known. Some embodiments can also use directional drilling, as will be described hereinafter.

A drill string 12 is suspended within the borehole 11 and has a bottom hole assembly 100 which includes a drill bit 105 at its lower end. The surface system includes platform and derrick assembly 10 positioned over the borehole 11, the assembly 10 including a rotary table 16, kelly 17, hook 18 and rotary swivel 19. The drill string 12 is rotated by the rotary table 16, energized by means not shown, which engages the kelly 17 at the upper end of the drill string. The drill string 12 is suspended from a hook 18, attached to a traveling block (also not shown), through the kelly 17 and a rotary swivel 19 which permits rotation of the drill string relative to the hook. As is well known, a top drive system could alternatively be used.

In the example of this embodiment, the surface system further includes drilling fluid or mud 26 stored in a pit 27 formed at the well site. A pump 29 delivers the drilling fluid 26 to the interior of the drill string 12 via a port in the swivel 19, causing the drilling fluid to flow downwardly through the drill string 12 as indicated by the directional arrow 8. The drilling fluid exits the drill string 12 via ports in the drill bit 105, and then circulates upwardly through the annulus region between the outside of the drill string and the wall of the borehole, as indicated by the directional arrows 9. In this well known manner, the drilling fluid lubricates the drill bit 105 and carries formation cuttings up to the surface as it is returned to the pit 27 for recirculation.

The bottom hole assembly 100 of the illustrated embodiment includes a logging-while-drilling (LWD) module 120, a measuring-while-drilling (MWD) module 130, a roto-steerable system and motor, and drill bit 105.

The LWD module 120 is housed in a special type of drill collar, as is known in the art, and can contain one or a plurality of known types of logging tools. It will also be understood that more than one LWD and/or MWD module can be employed, e.g. as represented at 120A. (References, throughout, to a module at the position of 120 can alternatively mean a module at the position of 120A as well.) The LWD module includes capabilities for measuring, processing, and storing information, as well as for communicating with the surface equipment. In the present embodiment, the LWD module includes a resistivity measuring device.

The MWD module 130 is also housed in a special type of drill collar, as is known in the art, and can contain one or more devices for measuring characteristics of the drill string and drill bit. The MWD tool further includes an apparatus (not shown) for generating electrical power to the downhole system. This may typically include a mud turbine generator powered by the flow of the drilling fluid, it being understood that other power and/or battery systems may be employed. In the present embodiment, the MWD module includes one or more of the following types of measuring devices: a weight-on-bit measuring device, a torque measuring device, a vibration measuring device, a shock measuring device, a stick/slip measuring device, a direction measuring device, and an inclination measuring device.

Figure 2:
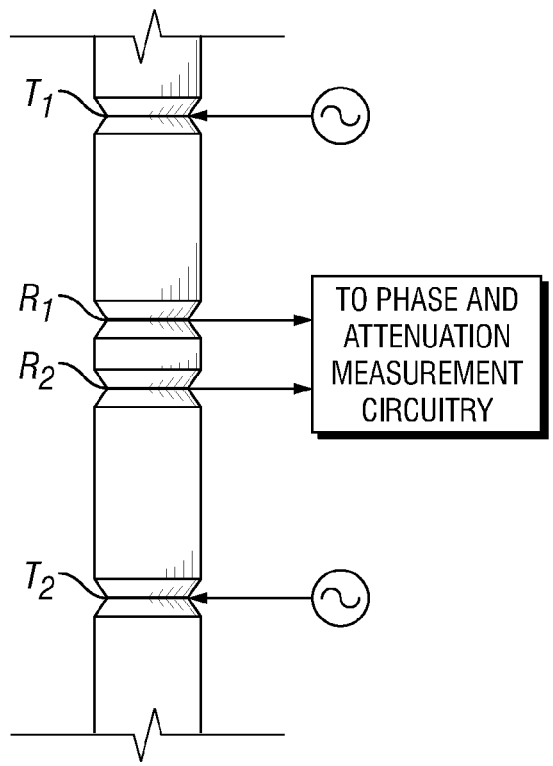
FIG. 2 shows a prior art electromagnetic logging tool.

An example of a tool which can be the LWD tool 120, or can be a part of an LWD tool suite 120A, is shown in FIG. 2. As seen in FIG. 2, upper and lower transmitting antennas, $T_1$ and $T_2$, have upper and lower receiving antennas, $R_1$ and $R_2$, therebetween. The antennas are formed in recesses in a modified drill collar and mounted in insulating material. The phase shift of electromagnetic energy as between the receivers provides an indication of formation resistivity at a relatively shallow depth of investigation, and the attenuation of electromagnetic energy as between the receivers provides an indication of formation resistivity at a relatively deep depth of investigation. U.S. Pat. No. 4,899,112 can be referred to for further details. In operation, attenuation-representative signals and phase-representative signals are coupled to a processor, an output of which is coupleable to a telemetry circuit.

Recent electromagnetic (EM) logging tools use one or more tilted or transverse antennas, with or without axial antennas. Those antennas may be transmitters or receivers. A tilted antenna is one whose dipole moment is neither parallel nor perpendicular to the longitudinal axis of the tool. A transverse antenna is one whose dipole moment is perpendicular to the longitudinal axis of the tool, and an axial antenna is one whose dipole moment is parallel to the longitudinal axis of the tool. A triaxial antenna is one in which three antennas (i.e., antenna coils) are arranged to be mutually orthogonal. Typically, one antenna (coil) is axial and the other two are transverse. Two antennas are said to have equal angles if their dipole moment vectors intersect the tool's longitudinal axis at the same angle. For example, two tilted antennas have the same tilt angle if their dipole moment vectors, having their tails conceptually fixed to a point on the tool's longitudinal axis, lie on the surface of a right circular cone centered on the tool's longitudinal axis and having its vertex at that reference point. Transverse antennas obviously have equal angles of 90 degrees, and that is true regardless of their azimuthal orientations relative to the tool.

An operator may log a section of a well with one of several logging tools. Critical elements of those tools may require calibration. During drilling, under certain conditions, some physical part of the tool may change permanently over the period of time the tool is in use. That change may render the prior (pre-) calibration useless. For example, the metal collar that houses measurement sensors may abrade due to severe drilling conditions, causing the collar's diameter to reduce beyond calibration limits.

A variable tool calibration system may be applied to a set of logging data (e.g., digital data). The logging device that generates the data set generally undergoes a calibration prior to use (pre-logging calibration). If the logging device experiences some type of permanent alteration during that use, such alteration can limit the pre-logging calibration values to be useful only to the beginning values of the data set. However, the tool can be re-calibrated after logging (post-logging calibration) to provide a new set of calibration values. The post-logging calibration values can be used to process the data near the end of the data set. Processing the data near the beginning of the data set with the pre-logging calibration values, and processing the data near the end of the data set with the post-logging calibration values, produces results that are more accurate than those obtained by applying only the pre-logging calibration values or only the post-logging calibration values to the entire data set.

That is, using the pre-logging calibration for the data in the beginning portion of the data set results in accurately calibrated log data for at least a short section at the beginning of the log. Once the tool is removed from the borehole and re-calibrated to account for any permanent change that alters the calibration data from the original pre-logging calibration, the post-logging calibration values may be applied to the data near the end of the data set, producing accurately calibrated log data for at least a short section at the end of the log. However, neither the pre-logging calibration values nor the post-logging calibration values necessarily accurately calibrates the data that exists between those beginning and end sections of data. In addition, a calibration measurement is not generally possible for the "middle" section of data because the tool is in use at that time.

Improvement may be had by using a blending function, referred to herein as "calibration blending" or a "calibration blending model". Using calibration blending, the measured calibrations can be combined to yield a varying calibration set that can be used at any point in the data set, thus restoring the accuracy of the entire data set. To achieve this, one or more synthetic calibrations between the pre- and post-logging calibrations may be created. The number of synthetic calibrations may be determined automatically or by user-defined logic. For example, the number of synthetic calibrations may depend on the calibrations limits or on the effects on a final measurement's specified accuracy limits. The logging data is then processed starting with the pre-logging calibration and ending with the post-logging calibration, and incrementally "switching" to the one or more intermediate synthetic calibrations already created via some switching logic that would result in accurate final data over the entire interval.

The following is one embodiment of calibration blending that uses a discrete linear calibration blending model. Assume the raw data (X) must be multiplied by 2.6 (the pre-logging calibration value) to get an accurate final measurement (Y). The basic calibration function is:

$$Y=2.6X.$$

If the raw data from the logging tool is 110.26, then the final calibrated measurement is 286.676. Further assume that during the logging operation some physical alteration occurred in the tool that rendered the original calibration (Y=2.6X)

invalid. Upon removal of the tool from the wellbore after completion of the logging run, the tool is re-calibrated and the resulting calibration function is determined, in this case, to be:

$$Y=4.1X.$$

Note, the generation of a digital data set such as this has a depth index associated with each data point. Assume that the digital data set started at a depth of 1000 feet and stopped at a depth of 2000 feet. We then have a set of raw data that has values at approximately 1000 feet that need the pre-logging calibration to compute accurate beginning final data, and raw data that has values at approximately 2000 feet that need the post-logging calibration to compute accurate ending final data. Note, the raw data at approximately 1500 feet has no measured calibration with which to generate accurate middle final data.

However, the creation of a calibration blending model allows for the creation of an estimation of a calibration at approximately 1500 feet that can be used to produce accurate final data at that depth. Thus, this particular embodiment has three calibration windows or intervals: a beginning, a middle (or intermediate), and an ending. To obtain the middle or intermediate calibration, one may compute the percentage increment in depth, and the percentage increment in the calibration function. The percentage increment in depth for this example is:

$$(2000-1500)/(2000-1000)=50\%.$$

That is as expected since 1500 feet is halfway between the start and stop depths. The percentage increment in the calibration function is:

$$(4.1-2.6)\times 50\%+2.6=3.35.$$

That is the calibration halfway between the pre- and post-logging calibrations. Thus, the three discrete calibration factors for the three windows are 2.6, 3.4, and 4.1, respectively.

One determination that must be made for the discrete linear calibration blending model is the number of increments to use to compute the calibration function. This would generally depend on the required level of accuracy for the final calibrated value. Ideally, one would create a new calibration function for each raw data point (i.e., at the same sampling rate as the raw data). That is, if there are 2000 data points, 2000 calibration functions would be used.

A continuous linear calibration blending model may be created as follows. Let D equal the depth index of the raw data point (X), and let C be the calibration function at depth D. Thus, C=2.6 at D=1000, and C=4.1 at D=2000. Inserting those points into the "y-intercept" equation of a line, C=mD+b, yields the two linear equations:

$$2.6=m(1000)+b,$$

and $$4.1=m(2000)+b.$$

Subtracting the first from the second yields:

$$1.5=m(1000), \text{ or } m=0.0015. \text{ Thus, } b=1.1,$$

and $$C=0.0015D+1.1.$$

Incorporating this into the original calibration function, Y=CX, yields:

$$Y=(0.0015D+1.1)X,$$

which is the final linear calibration blending model as a function of depth.

To specifically illustrate, to obtain the calibration for a depth of 1377 feet, we would compute a calibration function of Y=3.1655X. Then, if the raw data was 120.25 at depth 1377, the calibrated final data would be 380.65.

There may be, and generally are, numerous calibration parameters that change from pre-logging to post-logging. All of those are preferably modified using a calibration blending model and then applied to the raw data.

Figure 5:
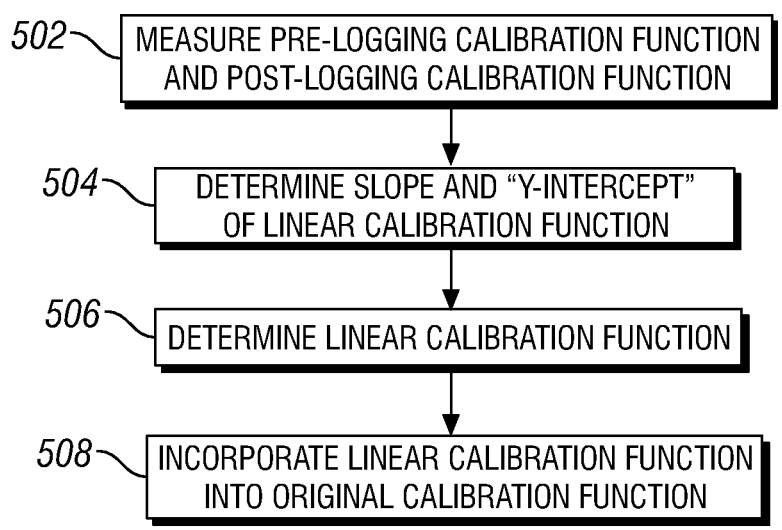
FIG. 5 is a flowchart showing the steps of an exemplary embodiment, in accordance with the present disclosure.

The continuous linear calibration blending model described above is summarized in the flowchart of FIG. 5. The pre-logging calibration function and the post-logging calibration function are measured (step 502). The slope and "y-intercept" of the linear calibration function is determined using the measured pre- and post-logging calibration functions (step 504). The linear calibration function is determined using the determined slope and y-intercept value (step 506). The linear calibration function is incorporated into the original calibration function (step 508).

The (discrete and continuous) linear calibration blending model assumes the "permanent alteration" in the physical tool occurs linearly from the start depth (no alteration) to the stop depth (maximum alteration) and also has a linear effect on the calibration changes. If this assumption is not correct, it will introduce error into the final calibrated data computed using this model. Another model might be a better choice. The choice of a better model will depend at least in part on what is causing the "permanent alteration" in the logging tool.

For example, assume the logging tool is an LWD density tool having critical elements contained inside an Integrated Blade Stabilizer (IBS). The tool is used to measure the density of the formation rock while the borehole is being drilled. In such a harsh environment, the IBS is slowly worn down by abrasive rock material as the IBS slides against the borehole wall. If the IBS size (outer diameter) at the beginning of logging run is 8.25 inches, but only 7.75 inches at the end of logging run, a total of 0.5 inches of metal was worn off during drilling. This means that the calibration value that was correct at the beginning of the drilling is now "out of calibration" at the end of drilling. If the wear experienced by the tool over this drilling interval is not linear, then the linear calibration blending model would not be appropriate. Instead of using a simple linear function, one could create a function based how the metal loss was occurring during drilling. The following are exemplary embodiments of non-linear calibration blending models.

Assume that the drilled interval was a sand-shale sequence and that the sand was more abrasive than the shale (a generally valid assumption). One could apply weighted blending parameters using greater weighting when wear occurs more rapidly and lesser weighting when wear occurs more slowly based on a simple measure of sand-shale volumes. This technique would not require knowledge of how much metal was lost. One could assign depths at which wear is considered to start (i.e., 0% loss) and at which wear is considered to have ended (i.e., 100% loss). This is preferably done with a known sampling rate and a way to identify sand and shale, and would provide a better estimate of rate of metal loss than the linear assumption above.

Figure 3:
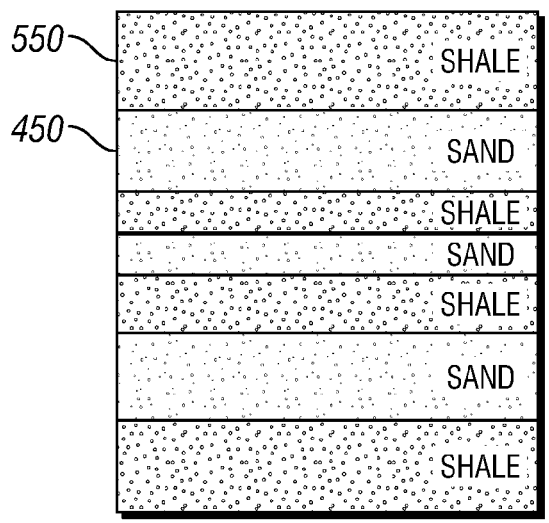
FIG. 3 schematically shows a formation model and corresponding log, in accordance with the present disclosure.
Figure 3:
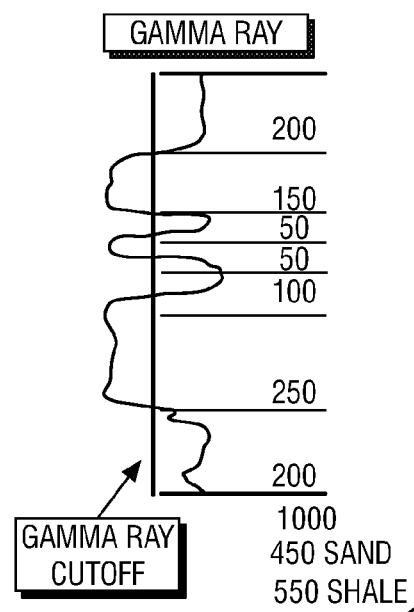

In one embodiment of a non-linear calibration model, one generates an incrementally increasing percent wear parameter that increments more slowly in one rock type (e.g., shale) and more rapidly in another rock type (e.g., sand) based on a relative weighting factor for each of the two rock types. FIG. 3 shows an exemplary sand-shale sequence. One could first make a logging run that would determine the total length of rock in a section of interest. For instance, using a gamma ray log, one would use a gamma ray cutoff value to assign an interval as either shale or sand. Compiling the thicknesses of each identified interval yields, in this example, a total of 450 feet of sand and 550 feet of shale.

A relative "abrasiveness" weighting factor is assigned for each rock type. For this example we assume:

$WFsh=0.3$ (less abrasive), and $WFsd=0.7$ (more abrasive).

From these we compute the percentage of wear due to shale and due to sand:

Sand $450\times0.7=315 \rightarrow 315/(315+165)=65.6\%$ total wear from sand, at a rate of $65.6\%/450$ ft$=0.1457778\%$/ft;

Shale $550\times0.3=165 \rightarrow 165/(315+165)=34.4\%$ total wear from shale, at a rate of $34.4\%/550$ ft$=0.06254545\%$/ft.

Next, a continuous data set is computed with the incremental percentage at each depth being based on whether there is sand or shale at that depth:

Inc Percent=(if $GR>GR$ cutoff, output=0.06254545, otherwise=0.1457778) for each data point.

This data set is then integrated from the start depth to the ending depth to form an integrated incremental percentage (IIP). This provides a value of percent wear at every point in the depth interval with 0% at the beginning depth and 100% at the ending depth.

Using the previous example's calibration data set:

$Y=2.6X$ at 1000 feet depth (0% wear), and $Y=4.1X$ at 2000 feet depth (100% wear).

Using the IIP wear data set, we can calculate the estimated calibration function as:

$Y=((IIP\times(4.1-2.6))+2.6)X$, where the IIP is a function of depth. This function can be applied to every calibration parameter and the entire data set can be reprocessed to get very accurate final data at any point in the logged interval based on the estimated actual wear of the IBS.

An alternative way to measure the wear of an IBS during drilling is to use the acoustic measurement used to measure the borehole size. During the measurement of hole size, an acoustic wave is sent from the tool to the rock wall and back. The time for this to occur depends on, among other things, the hole size. The two-way travel time is a measure of the time from when the acoustic wave is emitted to when the acoustic wave returns to an acoustic detector more or less co-located with the acoustic transmitter.

Figure 4:
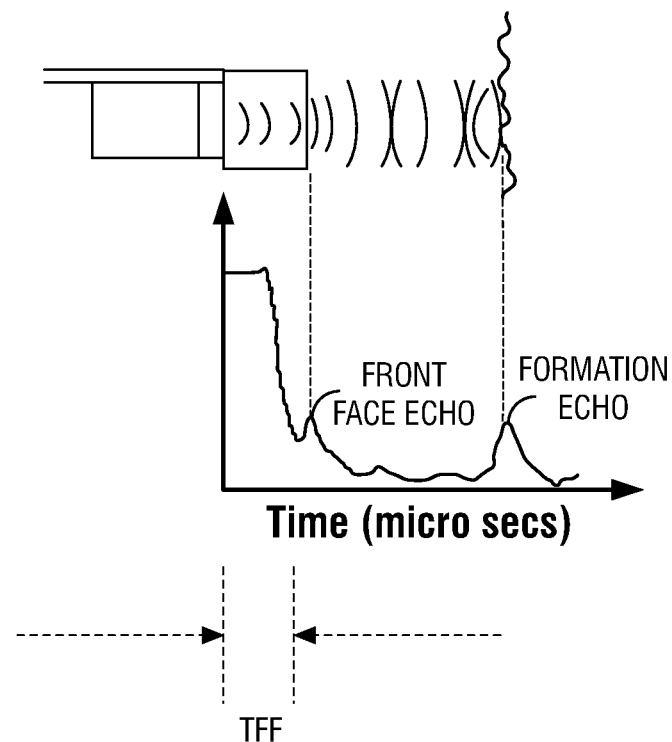
FIG. 4 schematically shows a transmitted and reflected acoustic signal traversing multiple media, along with corresponding two-way travel times, in accordance with the present disclosure.

As FIG. 4 shows, an acoustic wave propagates in a medium until it encounters a change in acoustic impedance, such as that of a different medium. According to the particular contrast in acoustic impedances, some portion of the wave is transmitted into the new medium, and some portion is reflected. FIG. 4 shows two contrasts in acoustic impedances that give rise to reflected waves. One contrast is between the wellbore fluid and the wellbore wall or formation. That two-way travel time measures the time from when the wave was emitted to when the wave reflected from the wellbore wall is detected (i.e., the formation echo). That time can be used to infer the hole diameter, as alluded to above.

The other contrast is between the outer surface of the tool IBS and the wellbore fluid. The corresponding two-way travel time, referred to herein as the time for front face echo, or Tff, is the travel time from when the wave was emitted to when the wave reflected from the IBS outer surface is detected. The time Tff becomes shorter as the tool surface wears down and the distance from the acoustic transmitter to the IBS outer surface becomes smaller. Thus, this time can be used as a direct measurement of the permanent alteration of the tool due to IBS wear. It can therefore be used to formulate an alternative embodiment of a calibration blending model.

For this embodiment we create, similar to the above, percentage wear data:

Tff0=time at 0% wear;

Tff100=time at 100% wear;

and

Percentage Wear (using the *IIP* from above)=$(Tff0-Tff(\text{meas}))/(Tff0-Tff100)$ where Tff(meas) is the measured time for the time for front face echo at any point in depth (i.e., Tff(meas) is a function of depth).

Now, using the same equation as before:

$Y=((IIP\times(4.1-2.6))+2.6)X$ where the IIP is again a function of depth.

A further embodiment of a calibration blending model uses a visual inspection of a known quantity to manually move from one incremental calibration to the next. This assumes that the total permanent alteration of the tool is small enough to allow for very few incremental calibrations to be used; say ten, for example. That is, one would have a total of ten calibrations starting with the pre-calibration and ending with the post-calibration. Thus, only eight synthetic incremental calibrations are created. This may be done using, for example, the linear calibration blending model, assuming there is a "known" quantity on which switching decisions can be based.

For example, assume that the bulk density correction near the bottom of the hole is supposed to normalize on zero because there is supporting evidence from an independent source that the hole is in very good shape (e.g., no washouts). Using the example in the original scenario:

$Y=2.6X$ at 1000 feet depth (0% wear), and $Y=4.1X$ at 2000 feet depth (100% wear).

To have ten calibration functions, eight additional calibration functions are created between those two calibration functions. To make eight additional calibrations, we need nine "gaps". For equal gap widths, the gap width is determined by:

$4.1-2.6=1.5$, and $1.5/9=0.16666667$.

To get the new calibration functions, one increments from the lowest interval value of 2.6 to the largest interval value of 4.1, using the determined gap width as follows:

$Y=2.6X$ at 1000 feet depth (0% wear)

$Y=2.766666667X$, $Y=2.933333334X$, $Y=3.100000001X$, $Y=3.266666668X$, $Y=3.433333335X$, $Y=3.600000002X$, $Y=3.766666669X$, $Y=3.933333336X$, and $Y=4.1X$ at 2000 feet depth (100% wear).

That creates the calibration functions to be used for a simple linear interval. To determine when to switch from one calibration to another, one may compute the final bulk density correction (the "known quantity") using the pre-logging calibration function, and then seeing whether the bulk density correction normalizes well on zero. That determination can be done automatically or manually (e.g., visually). If the bulk density correction does not normalize well on zero, as desired, the bulk density correction may be re-computed using the next calibration function, and the normalization-to-zero comparison made again. This may be repeated for each of the remaining calibration functions to determine the calibration function that yields the bulk density correction that best normalizes on zero.

It should be appreciated that while the invention has been described with respect to a limited number of embodiments, those skilled in the art, having benefit of this disclosure, will appreciate that other embodiments can be devised which do not depart from the scope of the invention as disclosed herein. Accordingly, the scope of the invention should be limited only by the attached claims.

What is claimed is:

1. A method to calibrate logging measurements from a logging tool, comprising:
   providing a logging tool for which one or more attributes vary over the course of logging;
   obtaining a pre-logging calibration function relating to a configuration of the logging tool before a first logging operation, using a processor;
   obtaining logging measurements using the logging tool during the first logging operation, wherein the logging measurements relate to a property of materials surrounding the logging tool at a plurality of depths over a period of time of the first logging operation during which the one or more attributes of the logging tool vary;
   obtaining a post-logging calibration function relating to a change in the configuration of the logging tool that occurred over the course of the first logging operation, using the processor;
   determining a variable calibration function using the pre-logging calibration function and the post-logging calibration function, using the processor; and
   calibrating the logging measurements using the variable calibration function, using the processor.

2. The method of claim 1, wherein the change in the configuration of the logging tool comprises a permanent alteration in a physical structure of the logging tool.

3. The method of claim 1, wherein the variable calibration function comprises a discrete set of three or more calibration factors.

4. The method of claim 3, wherein the number of calibration factors equals the number of measured data points.

5. The method of claim 1, wherein the variable calibration function comprises a continuous linear function.

6. The method of claim 5, wherein the slope of the linear variable calibration function is a linear function of the measurement depth.

7. The method of claim 1, wherein the variable calibration function comprises a non-linear function.

8. The method of claim 7, wherein the non-linear function comprises weighted blending parameters that gradually account for the change in the configuration of the logging tool that occurred over the course of the first logging operation.

9. The method of claim 7, wherein the non-linear function comprises an incrementally increasing percent wear parameter that corresponds to the change in the configuration of the logging tool that occurred over the course of the first logging operation, wherein the percent wear parameter indicates a percentage of a material of the logging tool that is permanently worn away during the course of the first logging operation.

10. The method of claim 1, comprising making one or more measurements that relate to the one or more varying attributes that correspond to the change in the configuration of the logging tool, and using the one or more measurements that relate to the one or more varying attributes to determine the variable calibration function.

11. The method of claim 1, wherein the variable calibration function comprises a set of calibration functions, and comprising determining which member or members of the set of calibration functions to use based on a comparison of a determined value to a known quantity.

12. The method of claim 1, comprising using the calibrated measurements for well placement, formation properties evaluation, or reservoir structure evaluation, or any combination thereof.

13. A system to calibrate measurements from a logging tool, comprising:
   a logging tool for which one or more physical attributes vary over the course of logging, wherein the logging tool is configured to collect logging measurements over time in a first logging operation, wherein the logging measurements relate to a property of materials surrounding the logging tool at a plurality of depths, and wherein the logging tool is configured to have first attributes before the first logging operation takes place and second attributes different from the first attributes after the first logging operation takes place; and
   a processor configured to:
   obtain a pre-logging calibration function that calibrates data obtained from the logging tool when the logging tool has the first attributes;
   obtain the logging measurements collected by the logging tool in the first logging operation;
   obtain a post-logging calibration function that calibrates the logging measurements obtained from the logging tool when the logging tool has the second attributes different from the first attributes;
   determine a variable calibration function by weightedly combining the pre-logging calibration function and the post-logging calibration function over a first data set corresponding to the logging measurements obtained over time during the first logging operation; and
   calibrate the logging measurements of the first data set using the variable calibration function.

14. The system of claim 13, wherein the variable calibration function is configured to adjust the first data set to account for the change from the first attributes to the second attributes of the logging tool that occurred between before the first logging operation has begun and after the first logging operation has taken place.

15. The system of claim 13, wherein the variable calibration function comprises a continuous linear function.

16. The system of claim 13, wherein the variable calibration function comprises a non-linear function.

17. The system of claim 13, comprising a device configured to collect one or more measurements that relate to the one or more varying attributes to identify the first attributes and the second attributes, and wherein the processor uses the one or more measurements that relate to the one or more varying attributes to determine the variable calibration function.

18. The system of claim 13, wherein the calibrated logging measurements indicate well placement parameters, formation properties, or reservoir structure evaluation, or any combination thereof.

19. A system having a non-transitory computer-readable medium having a set of computer-readable instructions encoded thereon that, when executed, perform acts comprising:

obtaining a pre-logging calibration function that corrects data obtained by a logging tool at a start of a first logging operation, wherein the logging tool comprises one or more physical attributes that vary over the course of logging;

obtaining logging measurements using the logging tool in the first logging operation, wherein the logging measurements relate to a property of materials surrounding the logging tool at a plurality of depths over a period of time of the first logging operation, during which the one or more physical attributes of the logging tool vary;

obtaining a post-logging calibration function that corrects data obtained by the logging tool at an end of the first logging operation;

determining a variable calibration function using the pre-logging calibration function and the post-logging calibration function; and calibrating the logging measurements using the variable calibration function.

20. The system of claim 19, wherein the calibration function is discrete and linear, continuous and linear, discrete and non-linear, or continuous and non-linear.

* * * * *